US005857688A

United States Patent [19]

Swearingen

[11] Patent Number: 5,857,688

[45] Date of Patent: Jan. 12, 1999

[54] PORTABLE WHEELCHAIR

[76] Inventor: Judson S. Swearingen, 3767 Forest La. 116, Suite 450, Dallas, Tex. 75244-7100

[21] Appl. No.: 887,161

[22] Filed: Jul. 2, 1997

[51] Int. Cl.[6] .......... B62M 1/14

[52] U.S. Cl. .......... 280/250.1; 280/42; 280/650; 297/DIG. 4

[58] Field of Search .......... 297/DIG. 4; 280/650, 280/657, 658, 42, 250.1

[56] References Cited

U.S. PATENT DOCUMENTS

| | | | |
|---|---|---|---|
| 729,177 | 10/1903 | Holtz | 280/42 |
| 1,600,131 | 9/1926 | Overton . | |
| 2,625,207 | 1/1953 | Duke | 297/DIG. 4 |
| 2,675,057 | 4/1954 | Glass | 297/DIG. 4 |
| 3,618,968 | 11/1971 | Greer | 280/250.1 |
| 3,968,991 | 7/1976 | Maclaren | 297/45 |
| 4,320,818 | 3/1982 | Knoche | 188/2 |
| 4,477,098 | 10/1984 | Minnebraker | 280/242 |
| 4,648,615 | 3/1987 | Volin | 280/242 |
| 4,744,578 | 5/1988 | Stearns | 297/DIG. 4 |
| 4,809,818 | 3/1989 | Leggett et al. | 280/650 |
| 4,861,056 | 8/1989 | Duffy, Jr. et al. | 280/250 |
| 5,141,250 | 8/1992 | Morgan et al. | 280/250 |
| 5,154,438 | 10/1992 | Barclay | 280/250 |
| 5,186,480 | 2/1993 | Morgan et al. | 280/250 |
| 5,188,383 | 2/1993 | Thompson | 280/250 |
| 5,263,728 | 11/1993 | Patel et al. | 280/42 |
| 5,496,050 | 3/1996 | Geiger et al. | 280/650 |
| 5,560,627 | 10/1996 | Zatulovsky et al. | 280/42 |

FOREIGN PATENT DOCUMENTS

| | | | |
|---|---|---|---|
| 94/16660 | 8/1994 | WIPO | 280/250.1 |

*Primary Examiner*—J. J. Swann
*Assistant Examiner*—Michael Cuff
*Attorney, Agent, or Firm*—Browning Bushman

[57] ABSTRACT

A compact collapsible wheelchair comprises first and second side frames, wherein each side frame includes a seat support rod and wheel support member. A collapsible support framework is operatively attached to the first and second side frames and includes a first auxiliary seat support member and a second auxiliary seat support member positioned relative to a flexible seat connected between each seat support. The flexible seat is urged into engagement with the first and second auxiliary seat support members in response to the bodyweight of the user. At least one hinged cross brace extends between the first and second side frames for maintaining the side frames in spaced relationship when the wheelchair is in the open position. A first and second main wheel are attached to the wheel support members on the first and second side frames respectively. First and second smaller swivel wheels are attached to the wheel support member on the first side frame and on opposite sides of the first main wheel. Third and fourth smaller swivel wheels are also attached to the wheel support member on the second side frame and on opposite sides of the second main wheel.

15 Claims, 2 Drawing Sheets

PORTABLE WHEELCHAIR

FIELD OF THE INVENTION

The present invention is directed to a portable wheelchair that is lightweight in construction and collapsible for transportation and storage in standardized luggage compartments on airplanes, buses and the like. In particular, the present invention is economical to manufacture due to its lightweight construction and, while collapsible, is uniquely constructed to maintain maneuverability and stability during its use by incorporating a pair of collapsible support members adjacent a flexible seat in order that the collapsible support members may expand and stabilize a pair of side frame members when an individual's weight is transmitted through the flexible seat.

BACKGROUND OF THE INVENTION

Portable wheelchairs capable of folding or collapsing have been in use for many years to accommodate wheelchair users who travel and need to take their wheelchairs with them and store them in space limited compartments. Typically, wheelchairs that are designed to fold or collapse incorporate a pair of diagonally extending cross members secured between a right and left frame member which may be scissored together to collapse the wheelchair. Although increasing the collapsibility and portability of the wheelchair, the typical cross member frame sacrifices strength and stability.

Additionally, standard cross member frame construction for portable wheelchairs is bulky and heavy, making transportation or storage difficult at best. Consequently, portable wheelchairs are not designed for storage in standard luggage compartments such as on airlines, trains and other mass transit mediums.

For example, U.S. Pat. No. 5,560,627 to Zatulovsky et al; U.S. Pat. No. 4,861,056 to Duffy, Jr. et al, and U.S. Pat. No. 5,154,438 to Barclay, incorporate various cross member support structures for maintaining stability of the frame. It is also well known in the art to incorporate a plurality of links that join an upper portion of the cross member to an adjacent upper portion of the frame and that pivot at least at the point where the link is connected to the cross tube member for controlled folding of the cross members and preventing the same from spreading apart when the wheelchair is in its fully expanded position.

Although the prior art addresses some of the structural criteria necessary for maintaining a portable wheelchair that is structurally stable, the present invention provides for a more compact, lightweight collapsible wheelchair that is both structurally stable and suitable for travel and storage in standard luggage compartments.

SUMMARY OF THE INVENTION

It is therefore an object of the present invention to provide a compact collapsible wheelchair with improved stability by incorporating a collapsible support framework including a first auxiliary seat support member and a second auxiliary seat support member into a flexible seat such that the weight from a seated user of the compact collapsible wheelchair urges the flexible seat into engagement with the first and second auxiliary seat support members thus, separating and stabilizing a first and second side frame during use of the compact collapsible wheelchair.

It is another object of the present invention to provide a compact collapsible wheelchair that is sufficiently compact in design to enable its storage in standard luggage compartments on airlines, trains and other mass transit medium.

It is yet another object of the present invention to provide a compact collapsible wheelchair with a pair of main drive wheels for mobilizing the wheelchair and four smaller swivel wheels, each of which is attached to a distal end of each of a pair of side frame members and can rotate 360 degrees for improved maneuverability.

It is yet another object of the present invention to provide a compact collapsible wheelchair that utilizes a minimum number of parts for economical construction while maintaining structural integrity.

It is yet another object of the present invention to provide at least one hinged cross brace extending between the first and second side frames for maintaining the side frames in spaced relationship when the wheelchair is in its open position.

It is an advantage of the present invention to provide a collapsible support framework that comprises a first u-shaped support frame and a second u-shaped support frame that are pivotally joined to each other.

It is yet another advantage of the present invention to provide a strap connected to the flexible seat for collapsing the collapsible support framework.

It is yet another advantage of the present invention to provide a flexible back extended between and attached to each first and second side frame, respectively.

These and further objects, features and advantages of the present invention will become apparent from the foregoing detailed description, wherein reference is made to figures and the accompanying drawings.

DETAILED DESCRIPTION OF PREFERRED EMBODIMENTS

Figure 2:
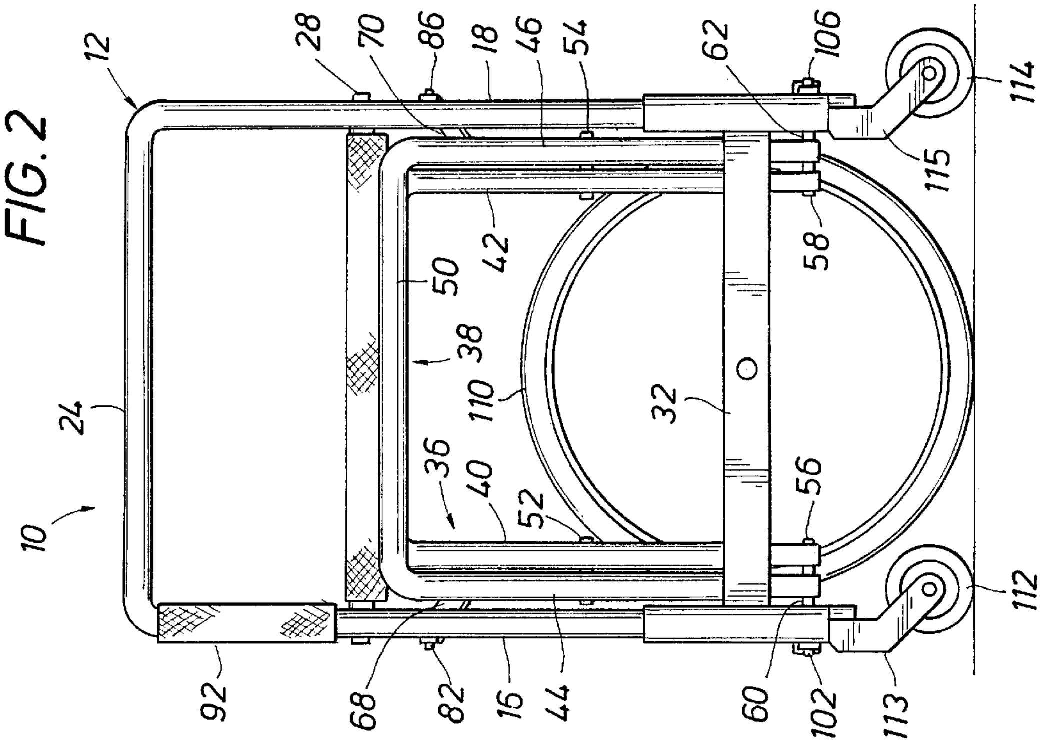
FIG. 2 is a side view of the present invention in its fully expanded position taken along 2—2.

A compact collapsible wheelchair 10 is shown comprising a first 12 and second 14 generally u-shaped side frame. The first u-shaped side frame 12 includes a first 16 and second 18 spaced side frame leg portions adjoined by an arm rest 24 substantially parallel to and above a seat support rod 28. Similarly, the second u-shaped side frame 14 includes a first 20 and second 22 side frame leg portions adjoined by an arm rest 26 substantially parallel to and above a seat support rod 30.

A flexible seat 88 is spanned between and attached to each of the seat support rods 28 and 30. The first u-shaped side frame 12 further includes a wheel support member 32 for attachment of a main wheel 108. Likewise, the second u-shaped side frame 14 includes a wheel support member 34 for attachment of a second main wheel 110.

A collapsible support framework is operatively attached to the first 12 and second 14 side frames and includes first 36 and second 38 u-shaped support frames. The first u-shaped support frame includes first 40 and second 42 spaced support frame leg portions adjoined by a first auxiliary seat support member 48. Likewise, a second u-shaped support frame 38 includes first 44 and a second 46 spaced support frame leg portions adjoined by a second 50 auxiliary seat support member. The first u-shaped support frame 36 is joined to the second u-shaped support frame 38 at first 52 and second 54 pivot points for scissoring the collapsible support framework together for transportation and storage of the compact collapsible wheelchair 10 and expanding the first 12 and second 14 side frames to improve stability during use of the compact collapsible wheelchair 10.

A distal end of the first 40 support frame leg portion of the first u-shaped support frame 36 is pivotally attached 56 to a distal end of the first side frame leg portion 16 of the first u-shaped side frame 12, and a distal end of the second support frame leg portion 42 of the first u-shaped support frame 36 is pivotally attached 58 to a distal end of the second side frame leg portion 38 of the first u-shaped side frame 12. A distal end of the first support frame leg portion 44 of the second u-shaped support frame 38 is pivotally attached 60 to a distal end of the first side frame leg portion 20 of the second u-shaped side frame 14, and distal end of the second support frame leg portion 46 of the second u-shaped support frame 14 is pivotally attached 62 to a distal end of the second side frame leg portion 22 of the second u-shaped side frame 14.

In a preferred embodiment, the first support frame leg portion 40 of the first u-shaped support frame 36 is generally tubular and is connected to a substantially flat extension 61 for pivotal attachment 56 of the distal end of the first u-shaped support frame leg portion 40 with the distal end of the first u-shaped side frame leg portion 16. The second u-shaped support frame leg portion 44 of the second u-shaped support frame 38 is also generally tubular and connected to a substantially flat extension 63 for pivotal attachment (not shown) of the distal end of the first support frame leg portion 44 with the distal end of the first u-shaped side frame leg portion 20 of the second u-shaped side frame 14.

Figure 3:
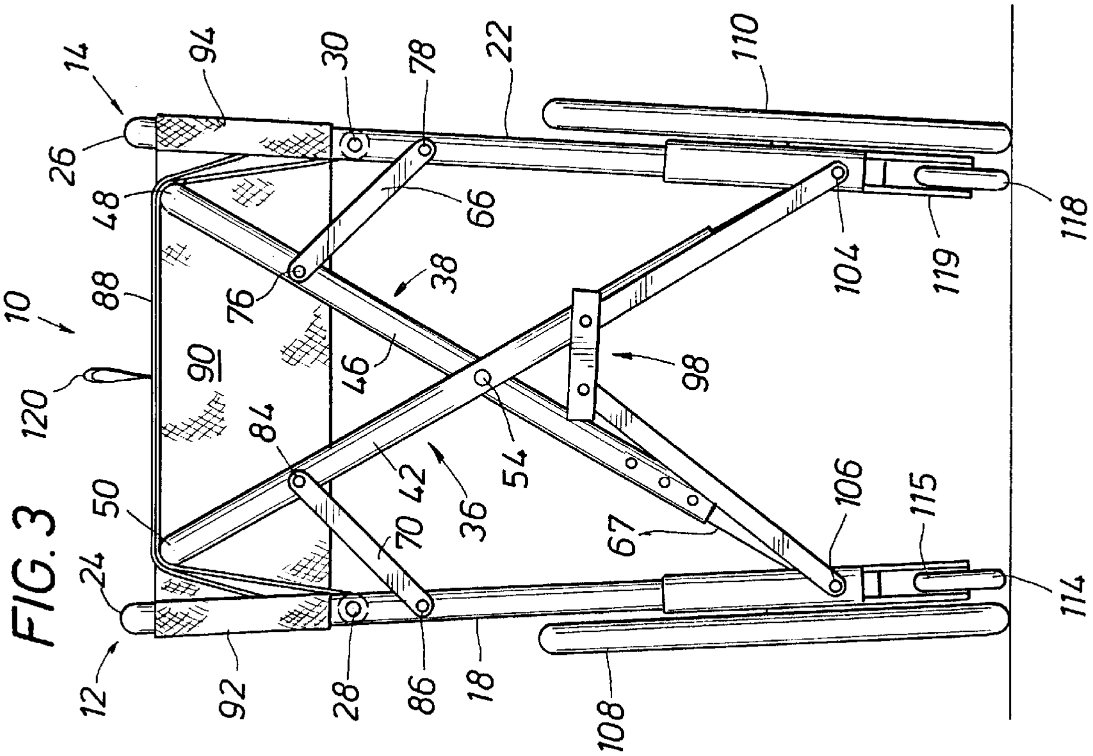
FIG. 3 is a top view of the present invention in a partially collapsed position.

With reference now to FIG. 3, the second support frame leg portion 42 of the first u-shaped support frame 36 and the second support frame leg portion 46 of the second u-shaped support frame 38 are also generally tubular and include substantially flat extensions 65 and 67 respectively for pivotal attachment (not shown) with each respective distal end of the second side frame leg portions 22 and 18, respectively. Alternatively, each first 40 and second 42 support frame leg portions of the first u-shaped support frame 36 and each first 44 and second 46 support frame leg portions of the second u-shaped support frame 38 may be constructed from a single integral piece of tubing.

Referring generally to FIGS. 1–4, the first 40 and second 42 support frame leg portions of the first u-shaped support frame 36 are moveably joined to the first 20 and second 22 side frame leg portions of the second u-shaped side frame 14 by first 64 and second 66 link members. The first 44 and second 46 support frame leg portions of the second u-shaped support frame 38 are likewise moveably joined to the first 16 and second 18 side frame leg portions of the first u-shaped side frame 12 by third 68 and fourth 70 link members. The first link member 64 includes a first end 72 pivotally attached to the first support frame leg portion 40 of the first u-shaped support frame 36 intermediate the first auxiliary seat support member 48 and the joinder 52 with the second u-shaped support frame 38. The second end 74 of the first link member 64 is pivotally attached to the first side frame leg portion 20 of the second u-shaped side frame 14 intermediate the seat support rod 30 and wheel support member 34.

The second link member 66 includes a first end 76 pivotally attached to the second support frame leg portion 42 of the first u-shaped support frame 36 intermediate the first auxiliary seat support member 48 and the joinder 54 with the second u-shaped support frame 38. The second end 78 of the second link member 66 is pivotally attached to the second side frame leg portion 22 of the second u-shaped side frame 14 intermediate the seat support rod 30 and wheel support member.

The third link member 68 includes a first end 80 pivotally attached to the first support frame leg portion 44 of the second u-shaped support frame 38 intermediate the second auxiliary seat support member 50 and the joinder 52 with the first u-shaped support frame 36. A second end 82 of the third link member 68 is pivotally attached to the first side frame leg portion 16 of the first u-shaped side frame 12 intermediate the seat support rod 28 and wheel support member 32.

The fourth link member 70 includes a first end 84 pivotally attached to the second support frame leg portion 46 of the second 38 u-shaped support frame 38 intermediate the second auxiliary seat support member 50 and the joinder 54 with the first u-shaped support frame 36. A second end 86 of the fourth link member 70 is pivotally attached to the second side frame leg portion 18 of the first u-shaped side frame 12 intermediate the seat support rod 28 and the wheel support member 32.

Consequently, each first 48 and second 50 auxiliary seat support member is positioned adjacent and below the flexible seat 18 whereby the flexible seat 88 is urged into engagement with the first 48 and second 50 auxiliary seat support members in response to the body weight of the user. The weight of an individual user during use of the collapsible wheelchair 10 forces the first 36 and second 38 u-shaped support frames into an expanded open position causing the first 12 and second 14 u-shaped side frames to expand away from each other forcing the wheelchair into a fully open position and allowing the first 96 and second 98 hinged cross braces to be locked in order to secure the open position of the collapsible wheelchair 10, even when an individual is not seated thereon. Additionally, the placement of the first 36 and second 38 u-shaped support frames adjacent and generally parallel to the seat support rods 28 and 30, allow the weight of an individual seated in the flexible seat 88 to further stabilize the collapsible wheelchair 10.

In a preferred embodiment, a flexible back 90 is provided having a first end 92 attached to the first side frame leg portion 16 of the first u-shaped side frame 12 intermediate the arm rest 24 and the seat support rod 28, and a second end 94 attached to the first side frame leg portion 20 of the second u-shaped side frame 14 intermediate the arm rest 26 and seat support rod 30.

Figure 1:
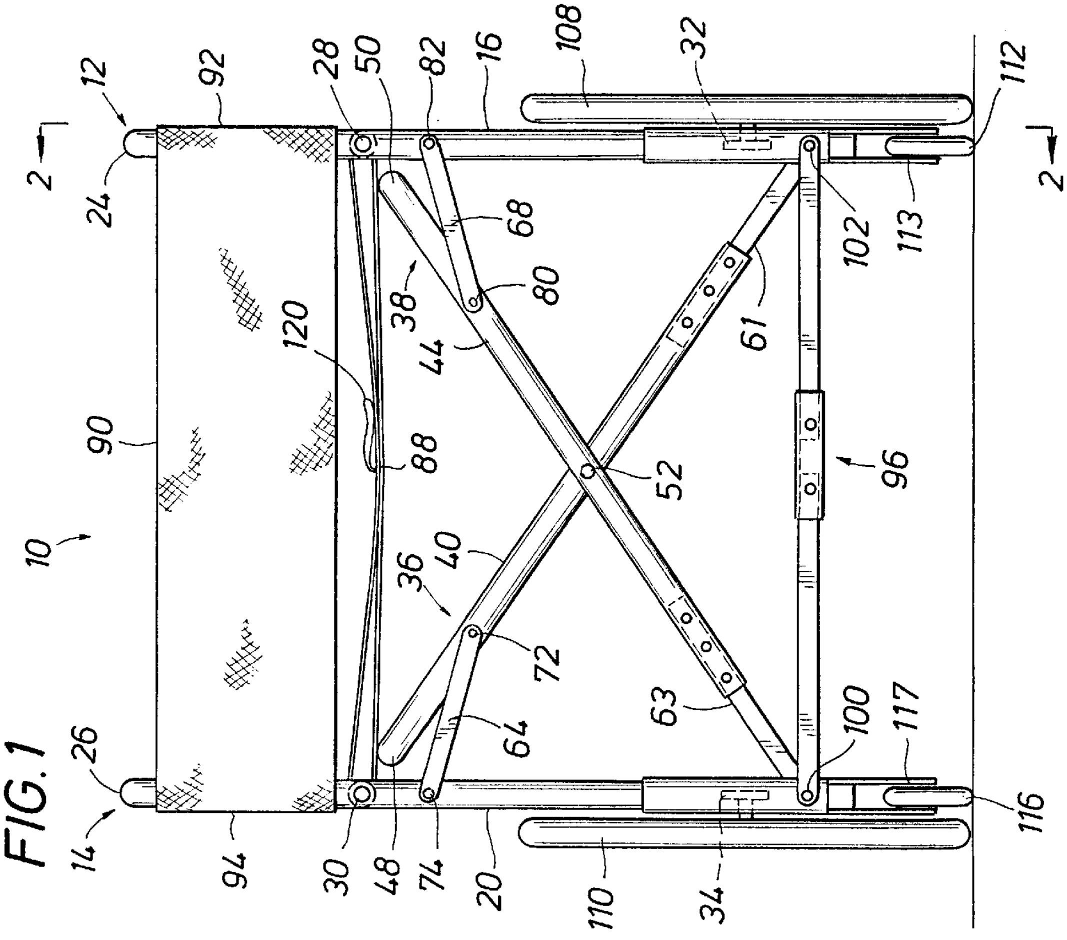
FIG. 1 is a back view of the present invention in its fully expanded position.

In order to facilitate maintaining the first 12 and second 14 side frames in a spaced relationship when the collapsible wheelchair 10 is in an open position, a first 96 and a second 98 hinged cross brace are provided as shown in FIGS. 1 and 3. The first 96 hinged cross brace has a first end 100 pivotally joined to the distal end of the first side frame leg portion 20 of the second u-shaped side frame 14 and a second end 102 pivotally joined to the distal end of the first side frame leg portion 16 of the first u-shaped side frame 12. The first hinged cross brace 96 is forced into a locked position as shown in FIG. 1, thus maintaining the collapsible wheelchair 10 in an open position during its use. Once the collapsible wheelchair 10 is ready for storage and transportation, the first 96 and second 98 hinged cross brace may be unlocked thus, permitting the collapse of the wheelchair 10 by scissoring the first 36 and second 38 u-shaped support frames together as shown in FIG. 3. Accordingly, the second 98 hinge cross-brace has a first end 104 pivotally joined at the distal end of the second side frame leg portion 22 of the second u-shaped side frame 14 and a second end 106 pivotally joined to the distal end of the second side frame leg portion 18 of the first u-shaped side frame 12 as also shown by FIG. 3. Each first 96 and second 98 hinged cross-brace may be spring biased such that the collapsible wheelchair 10 is self-collapsing except when the weight of an individual user forces the first 36 and second 38 u-shaped support frames to expand the first 12 and 14 u-shaped side frames into an open position as explained hereinabove.

Figure 4:
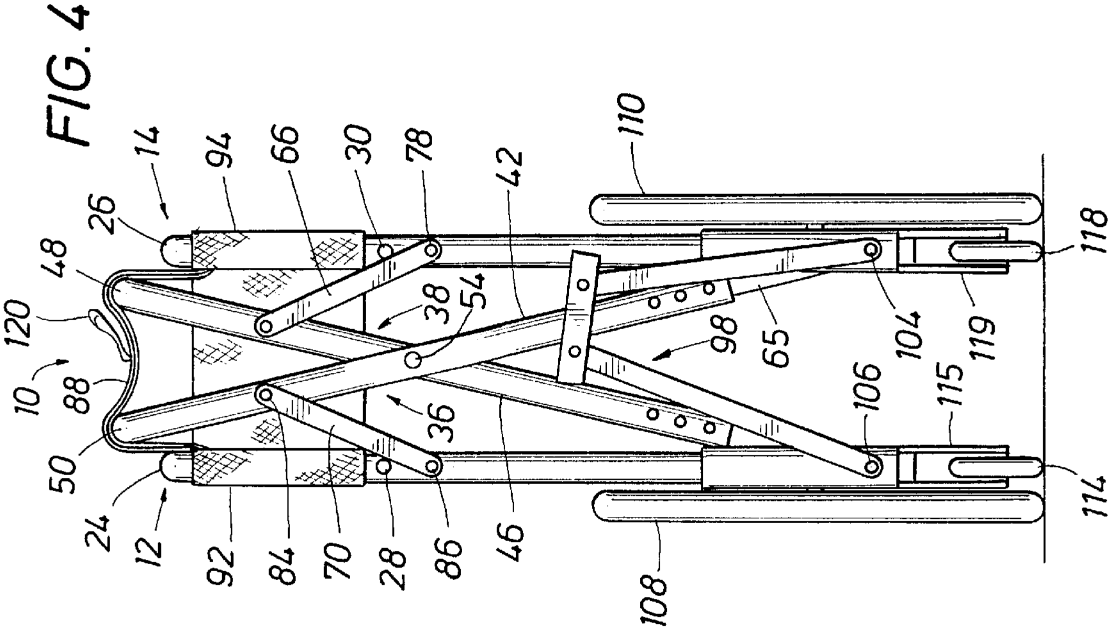
FIG. 4 is a front view of the present invention in a fully collapsed position.

In a preferred embodiment, a strap 120 is connected in the flexible seat 88 to the collapsible support framework in order to facilitate the collapse of the collapsible wheelchair 10 by forcing the first 12 and second 14 u-shaped side frames inward, causing the first 36 and second 38 u-shaped support frames to collapse inward when the first 96 and second 98 hinged cross braces are released as progressively shown in FIGS. 1, 3 and 4.

In order to facilitate maneuverability of the collapsible wheelchair 10 and provide a tighter turning radius, first 112 and second 114 smaller swivel wheels are operatively attached to the wheel support member 32 at a distal end of the first 16 and second 18 side frame leg portions, respectively. The first smaller swivel wheel 112 is therefore, directly attached to a brace 113 which in turn is connected to the wheel support member 32 at a distal end of the first side frame leg portion 16 of the first side frame 12. Likewise, the second smaller swivel wheel 114 is directly attached to a second brace 115 which in turn is attached to the wheel support member 32 at a distal end of the second side frame leg portion 18 of the first u-shaped side frame 12.

Third 116 and fourth 118 smaller swivel wheels are also operatively attached to the wheel support member 34 on the second u-shaped side frame 14. Accordingly, the third smaller swivel wheel 116 is directly attached to a third brace 117 which in turn is attached to a distal end of the first side frame leg portion 20 of the second u-shaped side frame 14, and the fourth 118 smaller swivel wheel is directly attached to a fourth brace 119 at a distal end of the second side frame leg portion 22 of the second u-shaped side frame 14 as shown in FIGS. 1 and 3. The first 112, second 114, third 116, and fourth 118 smaller swivel wheels are capable of swiveling 360 degrees to improve balance and maneuverability of the collapsible wheelchair 10. Thus, by reducing the collapsible wheelchair 10 in weight and size, it becomes more portable and suitable for travel and storage in standard luggage compartments on airlines, trains and the like.

From the foregoing it will be seen that this invention is one well adapted to accomplish all the ends and objects herein and above set forth, together with other advantages which are obvious and inherent to the apparatus and structure. It will be understood that certain features and subcombinations are of utility and may be employed without reference to other features and sub-combinations. This is contemplated by and is within the scope of the claims. Because many possible embodiments may be made of the invention without departing from the scope hereof, it is to be understood that all matters herein set forth and shown in the accompanied drawings are to be interpreted as illustrative only and not in a limiting sense.

What is claimed is:

1. A compact collapsible wheelchair comprising:

first and second side frames, each of said side frames including a seat support rod and a wheel support member, parallel to said seat support rod;

a collapsible support framework operatively attached to said first and second side frames, said collapsible support framework including a first auxiliary seat support member and a second auxiliary seat support member, said collapsible support framework being interconnected to said first and second side frames such that when said wheelchair is in an open position, said first and second auxiliary seat support members are disposed closely adjacent and generally parallel to said seat support rods on said first and second side frames respectively;

a flexible seat spanned between and attached to each of said seat support rods, said first and second auxiliary seat support members being positioned relative to said seat and said seat support rods whereby said seat is urged into engagement with first and second auxiliary seat support members in response to the body weight of a user;

at least one hinged cross brace extending between said first and second side frames for maintaining said side frames in a spaced relationship when said wheelchair is in said open position;

first and second main wheels rotatable attached to said wheel support members on said first and second side frames respectively;

first and second, smaller swivel wheels attached to said wheel support member on said first side frame and on opposite sides of said first main wheel;

third and fourth smaller swivel wheels attached to said wheel support member on said second side frame and on opposite sides of said second main wheel, whereby said wheelchair is simultaneously supported on said first and second main wheels and said first and second and said third and fourth smaller swivel wheels on a planar surface.

2. The compact collapsible wheelchair as defined in claim 1, wherein said first and second side frames further comprise:

a first u-shaped side frame and a second u-shaped side frame, each first and second u-shaped side frames including first and second spaced side frame leg portions adjoined by an arm rest substantially parallel to and above said seat support rod.

3. The compact collapsible wheelchair as defined in claim 1, wherein said collapsible support framework further comprises:

a first u-shaped support frame and a second u-shaped support frame, each first and second u-shaped support frames having first and second spaced support frame leg portions adjoined by said first and second auxiliary seat support members, respectively.

4. The compact collapsible wheelchair as defined in claim 3, wherein said first u-shaped support frame is pivotally joined to said second u-shaped support frame at a connection.

5. The compact collapsible wheelchair as defined in claim 4, wherein a distal end of said first support frame leg portion of said first u-shaped support frame is pivotally attached to a distal end of said first side frame leg portion of said first u-shaped side frame, and a distal end of said second support frame leg portion of said first u-shaped support frame is pivotally attached to a distal end of said second side frame leg portion of said first u-shaped side frame.

6. The compact collapsible wheelchair as defined in claim 5, wherein a distal end of said first support frame leg portion of said second u-shaped support frame is pivotally attached to a distal end of said first side frame leg portion of said second u-shaped side frame, and a distal end of said second support frame leg portion of said second u-shaped support frame is pivotally attached to a distal end of said second side frame leg portion of said second u-shaped side frame.

7. The compact collapsible wheelchair as defined in claim 6, wherein said first and second support frame leg portions of said first u-shaped support frame are moveably joined to said second u-shaped side frame and said second u-shaped support frame is moveably joined to said first u-shaped side frame.

8. The compact collapsible wheelchair as defined in claim 7, wherein said first and second support frame leg portions of said first u-shaped support frame are moveably joined to said first and second side frame leg portions of said second u-shaped side frame by first and second link members, and said first and second support frame leg portions of said second u-shaped support frame are moveably joined to said first and second side frame leg portions of said first u-shaped side frame by third and fourth link members.

9. The compact collapsible wheelchair as defined in claim 8, wherein said first link member includes a first end pivotally attached to said first support frame leg portion of said first u-shaped support frame intermediate said first auxiliary seat support member and said connection, and a second end pivotally attached to said first side frame leg portion of said second u-shaped side frame intermediate said seat support rod and said wheel support member.

10. The compact collapsible wheelchair as defined in claim 9, wherein said second link member includes a first end is pivotally attached to said second support frame leg portion of said first u-shaped support frame intermediate said first auxiliary seat support member and said connection, and a second end pivotally attached to said second side frame leg portion of said second u-shaped side frame intermediate said seat support rod and said wheel support member.

11. The compact collapsible wheelchair as defined in claim 10, wherein said third link member includes a first end pivotally attached to said first support frame portion of said second u-shaped support frame intermediate said second auxiliary seat support member and said connection, and a second end pivotally attached to said first side frame leg portion of said first u-shaped side frame intermediate said seat support rod and said wheel support member.

12. The compact collapsible wheelchair as defined in claim 11, wherein said fourth link member includes a first end pivotally attached to said second support frame leg portion of said second u-shaped support frame intermediate said second auxiliary seat support member and said connection, and a second end pivotally attached to said second side frame leg portion of said first u-shaped side frame intermediate said seat support rod and said wheel support member.

13. The compact collapsible wheelchair as defined in claim 11, further comprising:

a flexible back having a first end attached to the first side frame leg portion of said first u-shaped side frame intermediate said arm rest and said seat support rod and a second end attached to said first side frame leg portion of said second u-shaped side frame intermediate said arm rest and said seat support rod.

14. The compact collapsible wheelchair as defined in claim 2, further comprising:

a first hinged cross brace and a second hinged cross brace, said first hinged cross brace having a first end pivotally joined to the distal end of said first side frame leg portion of said second u-shaped side frame and a second end pivotally joined to the distal end of said first side frame leg portion of said first u-shaped side frame, and said second hinged cross brace having a first end pivotally joined to the distal end of said second side frame leg portion of said second u-shaped side frame and a second end pivotally joined to the distal end of said second side frame leg portion of said first u-shaped side frame.

15. The compact collapsible wheelchair as defined in claim 1, further comprising:

a strap connected to said flexible seat for collapsing said collapsible support framework.

* * * * *